United States Patent
Roberts et al.

(10) Patent No.: US 11,233,277 B2
(45) Date of Patent: Jan. 25, 2022

(54) ELECTRIFIED VEHICLE TRACTION BATTERY COMPONENT IDENTIFICATION ASSEMBLY AND IDENTIFICATION METHOD

(71) Applicant: Ford Global Technologies, LLC, Dearborn, MI (US)

(72) Inventors: Daniel Paul Roberts, Livonia, MI (US); Francisco Fernandez-Galindo, Canton, MI (US); Benjamin A. Tabatowski-Bush, Ann Arbor, MI (US); Baojin Wang, Ypsilanti, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 16/569,959

(22) Filed: Sep. 13, 2019

(65) Prior Publication Data
US 2021/0083332 A1   Mar. 18, 2021

(51) Int. Cl.
*H01M 4/02* (2006.01)
*H01M 10/42* (2006.01)
*B60L 50/64* (2019.01)

(52) U.S. Cl.
CPC ......... *H01M 10/4221* (2013.01); *B60L 50/64* (2019.02); *H01M 10/4207* (2013.01); *H01M 10/4257* (2013.01); *H01M 2010/4278* (2013.01)

(58) Field of Classification Search
CPC .................................................... H01M 4/02
See application file for complete search history.

(56) References Cited

U.S. PATENT DOCUMENTS

| | | | |
|---|---|---|---|
| 5,644,209 A | 7/1997 | Chabbert et al. | |
| 8,193,763 B2 | 6/2012 | Kawata et al. | |
| 9,196,930 B2 | 11/2015 | Chorian et al. | |
| 9,214,822 B2 | 12/2015 | Hartley et al. | |
| 9,520,730 B2 | 12/2016 | Wong et al. | |
| 2008/0297104 A1* | 12/2008 | Rao | H02J 7/00036 320/106 |
| 2014/0327400 A1* | 11/2014 | Kudo | B60L 50/51 320/118 |
| 2018/0083244 A1 | 3/2018 | Montgomery et al. | |
| 2018/0337536 A1* | 11/2018 | Li | H01M 10/443 |

FOREIGN PATENT DOCUMENTS

| | | |
|---|---|---|
| CN | 204465040 U | 7/2015 |
| KR | 101408307 B1 | 6/2013 |

* cited by examiner

*Primary Examiner* — Jacob B Marks
(74) *Attorney, Agent, or Firm* — David Kelley, Esq.; Carlson, Gaskey & Olds, P.C.

(57) ABSTRACT

A vehicle assembly includes, among other things, a battery array, and an identifier that is associated with the battery array. The identifier is readable by a control module of an electrified vehicle when the battery array is in an installed position within the electrified vehicle.

14 Claims, 2 Drawing Sheets

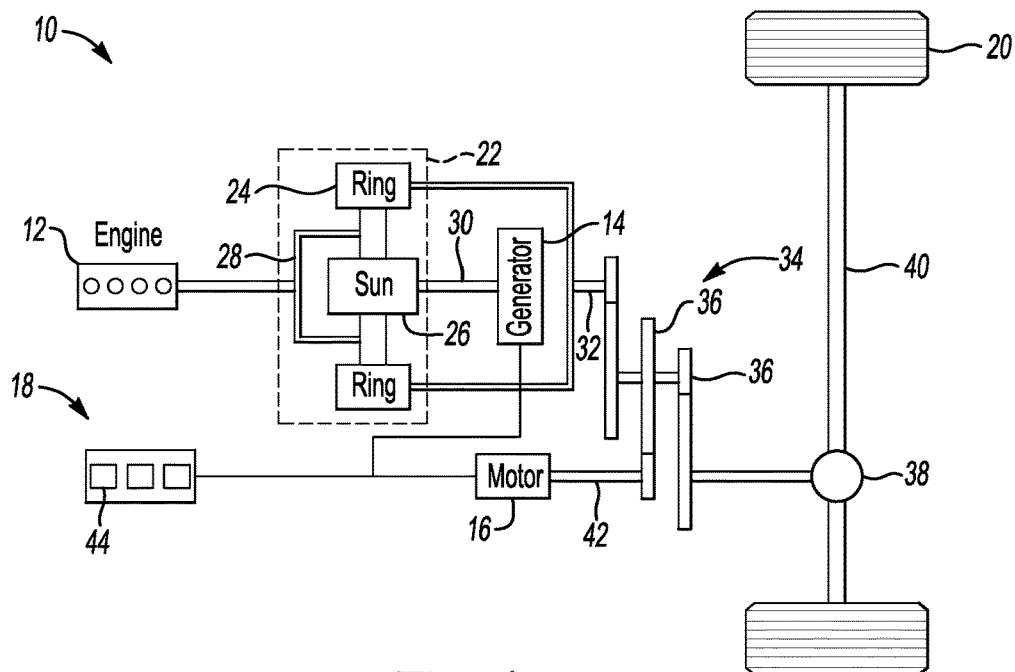
*Fig-1*
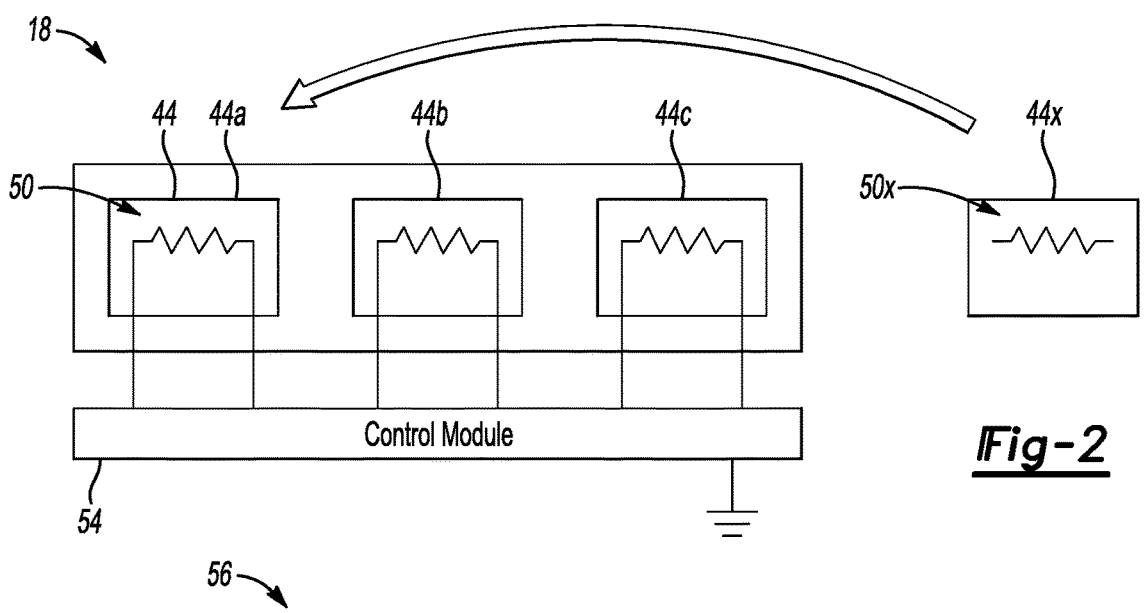
*Fig-2*
*Fig-3*
| Value | Chemistry |
|---|---|
| 10K Ω | Chemistry A |
| 20K Ω | Chemistry B |
| 30K Ω | Chemistry C |
| 40K Ω | Chemistry D |

ELECTRIFIED VEHICLE TRACTION BATTERY COMPONENT IDENTIFICATION ASSEMBLY AND IDENTIFICATION METHOD

TECHNICAL FIELD

This disclosure relates generally to an identifier associated with one or more components of a traction battery. The identifier can hold information about a particular battery array of the traction battery, for example.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells.

SUMMARY

A vehicle assembly, according to an exemplary aspect of the present disclosure includes, among other things, a battery array, and an identifier that is associated with the battery array. The identifier is readable by a control module of an electrified vehicle when the battery array is in an installed position within the electrified vehicle.

In another example of the foregoing assembly, the identifier provides an electrical parameter to the control module.

In another example of any of the foregoing assemblies, the identifier comprises a resistor.

In another example of any of the foregoing assemblies, the identifier comprises programmable memory.

In another example of any of the foregoing assemblies, the programmable memory stores a model number of the battery array.

In another example of any of the foregoing assemblies, the programmable memory comprises Electrically Erasable Programmable Read-Only Memory.

In another example of any of the foregoing assemblies, the control module can write information to the programmable memory when the battery array is in the installed position within the electrified vehicle.

In another example of any of the foregoing assemblies, the battery array is a first battery array within a traction battery and the identifier is a first identifier. The traction battery includes a second battery array and a second identifier. The second identifier is associated with the second battery array.

In another example of any of the foregoing assemblies, the first identifier is a first resistor having a first resistance and the second identifier is a second resistor having a second resistance that is different than the first resistance.

Another example of any of the foregoing assemblies includes the control module. The control module identifies a model number of the battery array based on the identifier.

Another example of any of the foregoing assemblies includes the control module. The control module identifies a distinguishing characteristic of the battery array based on the identifier.

A traction battery component identification method according to another exemplary aspect of the present disclosure includes, when a battery array is in an installed position within an electrified vehicle, communicating information from an identifier associated with the battery array to a control module of the electrified vehicle. The method further includes identifying a characteristic of the battery array based on the information from the identifier.

In another example of the foregoing method, the information is an electrical parameter associated with battery array.

In another example of any of the foregoing methods, the identifier comprises a resistor that provides a resistance value as the electrical parameter.

In another example of any of the foregoing methods, the identifying includes associating the resistance value with a particular cell chemistry for the battery array.

In another example of any of the foregoing methods, the identifying includes identifying a model number of the battery array.

In another example of any of the foregoing methods, the identifier comprises programmable memory.

In another example of any of the foregoing methods, the identifier is programmed with a model number of the battery array.

In another example of any of the foregoing methods, the identifier is configured to be reprogrammed when the battery array is in the installed position within the electrified vehicle.

In another example of any of the foregoing methods, the identifier comprises Electrically Erasable Programmable Read-Only Memory.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 schematically illustrates a powertrain of an electrified vehicle.

FIG. 2 schematically illustrates an identification system utilized to identify battery arrays of a traction battery from the powertrain of FIG. 1.

FIG. 3 illustrates a table utilized by the identification system of FIG. 3.

DETAILED DESCRIPTION

Figure 4:
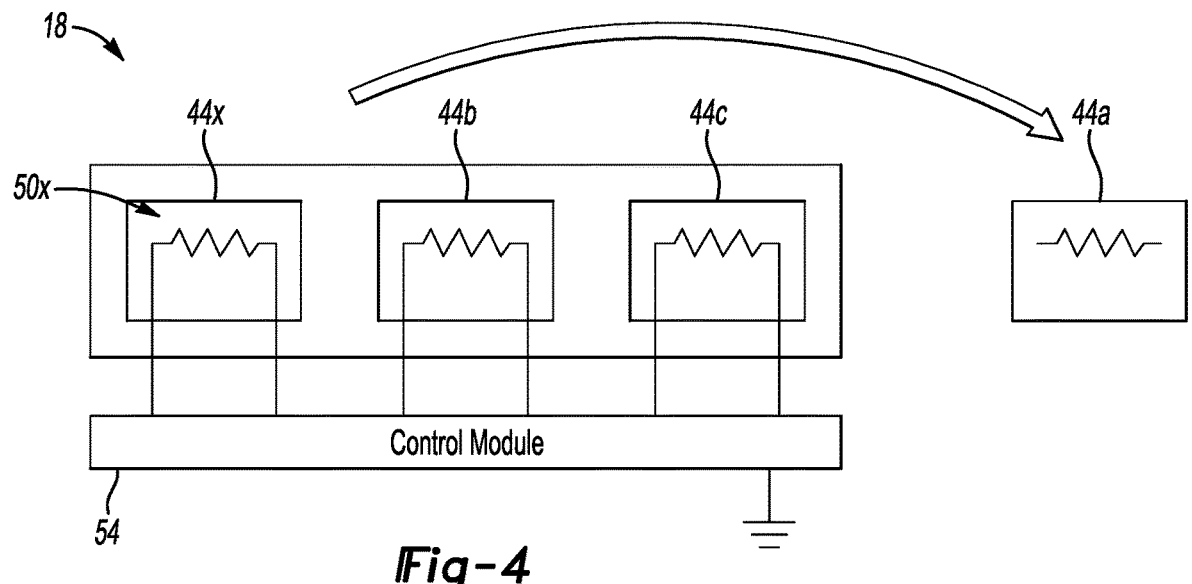
FIG. 4 illustrates the identification system of FIG. 2 after replacing one of the battery arrays within the traction battery.

Components of a traction battery can be periodically replaced, repaired, or otherwise serviced. Within a traction battery of an electrified vehicle, for example, an older battery array can be replaced with a newer battery array. A model of the newer battery array can differ from a model number of the older battery array.

This disclosure details methods and assemblies that are used to identify components of the traction battery. For example, a control module can interact with an identifier associated with a battery array to obtain identifying information about the battery array. The identifying information can help the control module to understand a battery cell chemistry of the battery array, a model number of the battery array, a manufacturing date of the battery array, or some other information about the battery array.

FIG. 1 schematically illustrates selected portions of a powertrain 10 of an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one traction battery 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the traction battery 18.

The traction battery 18 has the form of a high-voltage battery that is capable of outputting electrical power to operate the motor 16 and the generator 14. The traction battery 18 is a traction battery as the traction battery 18 can provides power to drive the vehicle drive wheels 20. In the exemplary embodiment, the traction battery 18 includes a plurality of battery arrays 44 within a battery pack. Each of the battery arrays 44 includes a plurality of individual battery cells, say from eight to twelve cells.

With reference now to FIG. 2, the battery arrays 44 are each associated with an identifier 50 that is operably connected to a control module 54. In the exemplary embodiment, the identifiers are resistors. The identifiers 50 can be mounted directly to the associated battery array 44. The identifiers 50 could instead, or additionally, be mounted to an interconnect board (ICB) or a busbar module of the respective battery array 44.

The battery arrays 44 of the traction battery 18 include a first battery array 44a, a second battery array 44b, and a third battery array 44c. An identifier 50a is associated with the first battery array 44a. Associated, for purposes of this disclosure, means that the identifier 50a can provide information specific to the first battery array 44. Additionally, in the traction battery 18, an identifier 50b is associated with the second battery array 44b. An identifier 50c is associated with the third battery array 44c.

The resistors for each of the identifiers 50a, 50b, 50c have a resistance value. Each resistance value can be used to retrieve information about the associated battery array 44a, 44b, 44c. The information can be, for example, a particular battery cell chemistry. In the exemplary embodiment, the control module 54 includes a look-up table stored in a memory portion that includes resistance values associated with particular battery cell chemistries. A graphical representation of an exemplary look-up table 56 is shown at FIG. 4.

Using a resistor as an identifier rather than, for example, a multiplexed wire, can be advantageous as only a single wire loop between the identifiers 50a, 50b, 50c, and the control module 54 is needed.

The control module 54 can read the identifier 50a by receiving an input corresponding to a resistance value for the resistor of the identifier 50a. The control module 54 can then refer to the look-up table 56 to find the battery cell chemistry associated with that resistance value.

In an exemplary embodiment, the control module 54 reads a resistance for the resistors of the identifiers 50a, 50b, 50c as part of a start-up procedure for the electrified vehicle. For example, the control module 54 can read the resistances after keying on the electrified vehicle at the start of a drive cycle and prior to placing the electrified vehicle in a drive gear. Based on the resistance readings, the control module 54 then assesses the battery cell chemistries for each the battery arrays 44a, 44b, and 44c.

In the exemplary embodiment, the identifier 50a associated with the battery array 44a has a resistance of 10 kiloohms. Thus, the control module 54 considers the battery array 44a to have a battery cell chemistry A. The chemistry A is lithium titanate in this example.

From time to time, one of the battery arrays 44a, 44b, or 44c could be swapped out for a replacement battery array 44x. Replacing the battery array 44a may be necessary due to the age of the battery array 44a, for example.

FIG. 4 shows the traction battery 18 after replacing the battery array 44a with the replacement battery array 44x. An identifier 50x, another resistor, is associated with the replacement battery array 44x.

After the replacement, in connection with keying on the electrified vehicle, the control module 54 calculates a value for the resistance of the identifier 50x, which is 20 kiloohms in this example. The control module 54 compares the resistance value of the identifier 50x to the look-up table 56 to determine the chemistry of the replacement battery array 44x.

In this example, the chemistry of the replacement battery array 44x is chemistry B. Chemistry B can be a lithium iron phosphate chemistry. Knowing the chemistry of the battery arrays 44 can enable the control module 54 to adapt when the chemistries change. As an example, change, the relationship between a cell voltage and a state of charge can vary for different cell chemistries. Thus, the control module 54 can, in response to the change in cell chemistries, referencing a different look-up table of cell voltage related to state of charge.

The identifiers 50 of the exemplary embodiment are utilized to reveal a chemistry of battery cells within the battery arrays 44. In another embodiment, the identifiers 50 instead or additionally reveal a model number of the associated battery arrays 44, or some other value associated with the battery arrays 44.

In the exemplary embodiment of FIGS. 2-4, resistors are used as the identifiers 50. The control module 54 receives an input of an electrical parameter (i.e., resistance) from the identifiers 50. The size and makeup of the resistor can be selected to provide the resistor with a particular resistance value. The control module 54 can identify a characteristic of the battery array based on the inputted electrical parameter received from the identifiers 50.

The identifiers 50 could instead or additionally incorporate components other than resistors that can output electrical parameters to the control module 54. For example, the identifiers 50 of the battery arrays within the traction battery 18 could instead each include a Zener diode. The control module 54 could cause a test current to be passed through the Zener diode. After which, a voltage reading from the Zener diode could be compared to a table of stored values to find a characteristic of the battery array 44 associated with that identifier.

In yet another example, the identifiers 50 could include capacitors, and the electrical characteristic could be impedance.

The control module 54, in the exemplary embodiment, is a traction battery sensing module (BPSM). In another example, the control module 54 could instead or additionally be a battery electronic control module (BECM).

While schematically illustrated as a single controller, the control module 54 may be part of a larger control system that may be controlled by various other controllers throughout the vehicle, such as a vehicle system controller (VSC) that includes a powertrain control unit, a transmission control unit, and engine control unit, etc. It should therefore be understood that the control module 54 and one or more other controllers can collectively be referred to as a controller that controls, such as through a plurality of interrelated algorithms, the association of the electrical parameter from the identifier 50 with an identifying characteristic of the battery array 44 associated with that identifier.

The control module 54 can include a microprocessor or central processing unit (CPU) in communication with various types of computer readable storage devices or media. Computer readable storage devices or media may include volatile and nonvolatile storage and read-only memory (ROM), random-access memory (RAM), and keep-alive memory (KAM), for example. KAM is a persistent or non-volatile memory that may be used to store various operating variables while a CPU of the control module 54 is powered down. KAM can clear when power is lost.

Computer-readable storage devices or media may be implemented within the control module 54 using any number of known memory devices, such as PROMS (programmable read-only memory), EPROMS (electrically PROM), EEPROMS (electrically erasable PROM), flash memory, or another electric, magnetic, optical, or combination memory devices capable of storing data some of which represent executable instructions used by the control module 54 to collect and assess information from the identifiers 50.

The control module 54 may communicate with the identifiers 50 as well as other various engine/vehicle sensors and actuators via an input/output interface implemented as a single integrated interface that provides various raw data or signal conditioning, processing, and/or conversion, short-circuit protection, and the like. One or more dedicated hardware or firmware chips could be used to condition and process particular signals before being supplied to a CPU of the control module 54.

Although not explicitly illustrated, those of ordinary skill in the art could recognize other various functions or components that may be controlled by the control module 54 within various subsystems of the electrified vehicle.

Control logic of the control module 54 can be implemented in software, hardware, or a combination of software and hardware in one or more specific controllers of the control module 54 depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical objects which utilize electric, magnetic, and/or optical storage to keep executable instructions and associated operating variables, threshold variables, and the like.

Figure 5:
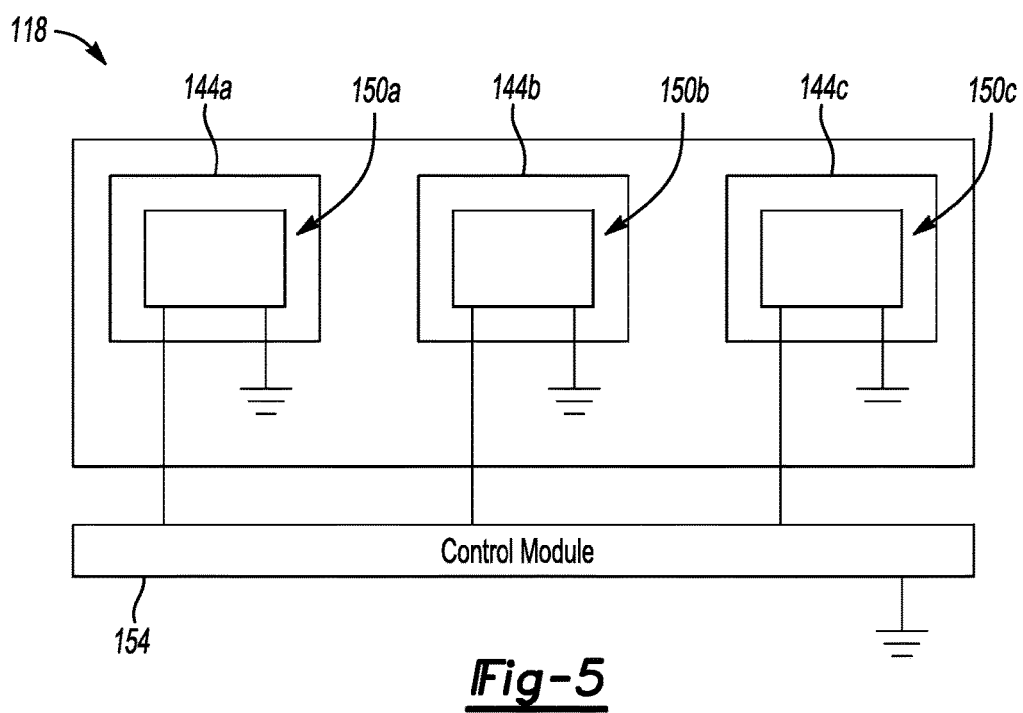
FIG. 5 illustrates an identification system according to another exemplary aspect of the present disclosure.

With reference now to FIG. 5, in another exemplary embodiment of the present disclosure, a traction battery 118 includes arrays 144 each with an identifier 150 that is operably connected to a control module 154. In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The identifiers 150 can be mounted to the respective battery array 144. In particular, the identifiers 50 can be mounted to a busbar module or interconnect board of the respective battery array 144.

The battery arrays 144 include a first battery array 144a, a second battery array 144b, and a third battery array 144c. An identifier 150a is associated with the first battery array 144a. An identifier 150b is associated with the second battery array 144b. An identifier 150c is associated with the third battery array 144c.

In the embodiment of FIG. 5, the identifiers 150 include programmable memory. The identifiers 150 can store, for example, a model number of the associated one of the battery arrays 144 or a serial number of the associated one of the battery arrays 144. The identifiers 150 can instead or additionally store a chemistry of the battery cells for the associated one of the battery arrays 144. Other information potentially stored on the identifiers 150 can include a battery array endplate type, a thermistor quantity, a cell wrap type, or some other characteristic that can vary between different battery arrays. Still other information potentially stored on the identifiers 150 can include a capacity of the associated battery array 144a, 144b, 144c, or manufacturing date code, etc. Using the resistance value to retrieve the manufacturing date code can reveal an age of the associated battery array 144a, 144b, or 144c. Still other types of information that could be retrieved by reading the resistance value could include an Irms to date for the associated battery array 144a, 144b, 144c, an average operating temperature, maximum operating temperature, minimum operating temperature, etc.

Because the identifiers 150 are operably connected to the control module 154, the control module 154 can read the programmable memory of the identifiers 150 to retrieve the identification information about the associated battery array 144.

In an exemplary embodiment, the programmable memory includes Electrically Erasable Programmable Read-Only Memory (EEPROM). The control module 154 can, in some examples, write information to the EEPROM of the identifier 150 when the identifier and its associated battery array 144 are in an installed position within the traction battery 118 of an electrified vehicle. The EPROM could connect to the control module 154 via a wire and bidirectionally communicate with the control module 154 using the wire.

For example, each time the battery array 144a undergoes a deep-discharge cycle, the control module 154 could increase a counter saved on the EPROM of the identifier 150a. Information stored on the identifiers 150 can thus be changed and added to when the battery arrays 144 are in the installed position. The EPROM could include a rewritable section and a permanent section. The rewritable section could include the counter and change in response to signals from the control module 154. The permanent section could contain a model number of the battery array 144, which is not rewriteable.

In some examples, the identifiers 150a, 150b, and 150c are each read as part of the start-up procedure for the electrified vehicle. If the control module 154 assesses that the battery arrays 144a, 144b, 144c are compatible with the control module 154, the start-up continues. If the control module 154 recognizes that the chemistry for the battery cells in one or more of the arrays 144a, 144b, 144c has changed, but that chemistry is compatible with the control module 154, the start-up continues. If the control module 154 recognizes that one or more of the battery arrays 144a, 144b, and 144c is not compatible with the control module 154, the control module 154 may issue a diagnostic trouble code or limit a power level provided by the traction battery 118 until the issue is resolved.

The control module 154 can, in some examples, act as a security measure to prevent stolen battery arrays. The control module 154 can, for example, only permit start-up of the electrified vehicle if the identifiers 150a, 150b, and 150c include a serial number of the battery arrays that is read and recognized by the control module 154.

The identifiers 50 of FIGS. 2 and 4, and the identifiers 150 of FIG. 5 can, in some examples, provide identification information when the associated battery arrays 44, 144 are not in an installed within the electrified vehicle. For example, if the battery array 44x in FIG. 2 is stored on a shelf outside the electrified vehicle in an uninstalled position, a user could use a multimeter to assess a resistance value for the identifier 50x associated with the battery array 44x. The user could then could then refer to a table to find out what chemistry is associated with the resistance value measured by the operator.

Similarly, when the battery array 144a is outside the traction battery 118 in an uninstalled position, a handheld controller could be operably coupled to the programmable memory of the identifier 150a to obtain information stored on the programmable memory.

Referring again to FIG. 4, when the replacement battery array 44x is installed within the traction battery 18, the control module 54 may utilize identification information provided by the identifier 50x to assess whether or not the battery array 44x is compatible with the traction battery 18. If not, the control module 54 may issue an alert or diagnostic trouble code to notify an operator or installer that the battery array 44x may require further analysis.

Features of the disclose examples include providing an identifying characteristic of a battery array to a control module. When a battery array is swapped, the control module can receive a new identifying characteristic from the new battery array. If the control module needs to operate a bit differently in response to the new battery array, the control module can adjust automatically. Due to the identifying characteristic, the control module recognizes that battery array has changed and knows the type of battery array it is controlling.

Currently, manufacturing process control procedures are utilized to ensure that correct BECM software is matched to the associated battery arrays.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a control module;
   a battery array; and
   an identifier that is associated with the battery array, the identifier readable by the control module of an electrified vehicle when the battery array is in an installed position within the electrified vehicle, the control module configured to identify a distinguishing characteristic of the battery array based on the identifier,
   wherein the battery array is a first battery array within a traction battery and the identifier is a first identifier, wherein the traction battery includes a second battery array and a second identifier, the second identifier associated with the second battery array,
   wherein the first identifier includes a first resistor having a first resistance and the second identifier includes a second resistor having a second resistance that is different than the first resistance.

2. The vehicle assembly of claim 1, wherein the identifier provides an electrical parameter to the control module.

3. The vehicle assembly of claim 2, wherein the identifier comprises a resistor.

4. The vehicle assembly of claim 1, wherein the identifier comprises programmable memory.

5. The vehicle assembly of claim 4, wherein the programmable memory stores a model number of the battery array.

6. The vehicle assembly of claim 4, wherein the programmable memory comprises Electrically Erasable Programmable Read-Only Memory.

7. The vehicle assembly of claim 6, wherein the control module can write information to the programmable memory when the battery array is in the installed position within the electrified vehicle.

8. The vehicle assembly of claim 1, wherein the control module is configured to identify a model number of the battery array based on the identifier.

9. A traction battery component identification method, comprising:
   when a battery array is in an installed position within an electrified vehicle, communicating information from an identifier associated with the battery array to a control module of the electrified vehicle; and
   identifying a distinguishing characteristic of the battery array based on the information from the identifier,
   wherein the information is an electrical parameter associated with battery array,
   wherein the electrical parameter is a resistance value of a resistor of the identifier,
   wherein the identifying includes associating the resistance value with a particular cell chemistry for the battery array.

10. The traction battery component identification method of claim 9, wherein the identifying includes identifying a model number of the battery array.

11. The traction battery component identification method of claim 9, wherein the identifier comprises programmable memory.

12. The traction battery component identification method of claim 11, wherein the identifier is programmed with a model number of the battery array.

13. The traction battery component identification method of claim 11, wherein the identifier is configured to be reprogrammed when the battery array is in the installed position within the electrified vehicle.

14. The traction battery component identification method of claim 11, wherein the identifier comprises Electrically Erasable Programmable Read-Only Memory.

* * * * *